(12) United States Patent
Arauz-Rosado (10) Patent No.: US 9,292,559 B2
(45) Date of Patent: Mar. 22, 2016

(54) DATA DISTRIBUTION/RETRIEVAL USING MULTI-DIMENSIONAL INDEX

(71) Applicant: Telefonaktiebolaget L M Ericsson (publ), Stockholm (SE)

(72) Inventor: Jesus-Javier Arauz-Rosado, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 486 days.

(21) Appl. No.: 13/743,988

(22) Filed: Jan. 17, 2013

(65) Prior Publication Data

US 2014/0201238 A1    Jul. 17, 2014

(30) Foreign Application Priority Data

Jan. 19, 2012   (WO) ................ PCT/EP2012/000235

(51) Int. Cl.
*G06F 17/30*    (2006.01)
(52) U.S. Cl.
CPC .... *G06F 17/30333* (2013.01); *G06F 17/30283* (2013.01)
(58) Field of Classification Search
None
See application file for complete search history.

(56) References Cited

U.S. PATENT DOCUMENTS

| 5,640,488 | A | 6/1997 | Junqua et al. | |
|---|---|---|---|---|
| 5,829,009 | A | 10/1998 | Frazier | |
| 6,285,995 | B1 | 9/2001 | Abdel-Mottaleb et al. | |
| 8,675,672 | B1* | 3/2014 | Bao | H04L 45/46 370/408 |
| 2007/0288655 | A1* | 12/2007 | Price et al. | 709/245 |
| 2008/0114793 | A1* | 5/2008 | Grosset et al. | 707/101 |
| 2009/0210418 | A1* | 8/2009 | Arasu et al. | 707/6 |
| 2010/0077101 | A1* | 3/2010 | Wang | H04L 67/104 709/238 |
| 2011/0208919 | A1* | 8/2011 | Pruthi | G06F 12/0862 711/137 |

OTHER PUBLICATIONS

Krishnamachari, S. et al., "Image Browsing using Hierarchical Clustering," Proceedings of the IEEE International Symposium on Computers and Communications, Jul. 1999, pp. 301-307.
Nakkrasae, S. et al., "Fuzzy Subtractive Clustering Based Indexing Approach for Software Components Classification," International Journal of Computer & Information Science, Mar. 2004, pp. 63-72, vol. 5, No. 1.
Wikipedia, the free encyclopedia, "Levenshtein distance," [retrieved May 17, 2013] Retrieved from the Internet: http://en.wikipedia.org/wiki/Levenshtein_distance.
Wikipedia, the free encyclopedia, "Damerau-Levenshtein distance," [retrieved May 17, 2013] Retrieved from the Internet: http://en.wikipedia.org/wiki/Damerau%E2%80%93Levenshtein_distance.

(Continued)

*Primary Examiner* — Richard Bowen
(74) *Attorney, Agent, or Firm* — Coats & Bennett, P.L.L.C.

(57) ABSTRACT

A distributed data storage system uses a data distribution and location algorithm based on distance functions and hyperspheres in a multi-dimensional space. The distributed data storage system uses the algorithm to maintain, over time, a balanced distribution across a number of computers interconnected by a network of a varying set of data items. Each data item includes one or more key fields. The system also includes an efficient partial-match and exact-match search across a whole set of data items using as search criteria the values of any or all of the sought data item's key field(s).

28 Claims, 9 Drawing Sheets

(56) References Cited

OTHER PUBLICATIONS

Chávez, E. et al., "A compact space decomposition for effective metric indexing," Pattern Recognition Letters, 2005, pp. 1363-1376, vol. 26, Elsevier.

Ramaswamy, S. et al., "Adaptive Cluster Distance Bounding for High-Dimensional Indexing," IEEE Transactions on Knowledge and Data Engineering, Jun. 2001, pp. 815-830, vol. 23, No. 6, IEEE Computer Society.

Novak, D. et al., "M-Chord: A Scalable Distributed Similarity Search Structure," Proceedings of the First International Conference on Scalable Information Systems, May 29-Jun. 1, 2006, Hong Kong.

Dohnal, V. et al., "Query Routing Mechanisms in Self-organizing Search Systems," Second International Workshop on Similarity Search and Applications, Aug. 29, 2009, pp. 132-139, IEEE Computer Society.

Yin, W. et al., "R-Chord: A Distributed Similarity Retrieval System with RPCID," IEEE International Conference on Network Infrastructure and Digital Content, Nov. 6, 2009, pp. 393-399.

\* cited by examiner

DATA DISTRIBUTION/RETRIEVAL USING MULTI-DIMENSIONAL INDEX

This application claims benefit of International Application PCT/EP2012/000235, filed with the European Patent Office on Jan. 19, 2012 under the Patent Cooperation Treaty (PCT), the disclosure of which is hereby incorporated by reference in its entirety.

BACKGROUND

The technology described herein relates to the area of data management and, more specifically, to distributed data storage including distributed databases.

A distributed data storage solution includes a number of physically distinct computers with associated physical storage (e.g., one or more hard drives, optical discs, etc.); each computer managing a data set that is a subset of a larger data set. A distributed data storage solution is used when the storage capacity of a single computer is not enough to hold the larger data set. Each subset varies in size up to the storage capacity provided by the computer on which the subset is deployed.

After the larger data set is split into subsets and deployed to a number of computers, retrieving an individual data item requires finding out which subset holds such data item. A retrieval request is addressed to the computer which the corresponding subset, has been deployed to (stored on). Two approaches can be used to quickly determine the involved subset: 1) a linear scan of every computer by broadcasting a retrieval request to all computers storing the larger data set. This approach is inefficient as only one computer holds the subset that contains the individual data item (unless replicated), and 2) a data location algorithm that determines the specific computer (or computers, since data might be replicated for redundancy) where the subset holding the data item sought is held, and addressing the request to that computer only.

From the approaches above, the second one is usually preferred based on processing resources required. In the second solution, despite the added latency due to the execution of the data location algorithm, processing resources used by a retrieval request remain approximately constant (or rather, grow as O(log n), where n is defined as the number of individual data items in the larger data set and O is defined a function f(n) which is non-negative for all integers n≥0 and f(n)=O(g(n)), if there exists an integer $n_0$ and a constant c>0 such that for all integers n≥$n_0$, f(n)≤cg(n). Additional description can be found in "Data Structures and Algorithms with Object-Oriented Design Patterns in Python", Bruno R. Preiss et al, 2003. In the first approach, the resources grow as O(N), where N is defined as the number of subsets. When all the computers in the solution share the same data storage characteristics N=n/S, where S is defined as the storage capacity provided by one single computer in the solution. If n is very large, as is usual in distributed data storage solutions, there is considerable inefficiency with respect to use of processing resources associated to the first approach.

Solutions applying the second approach are further characterized by type of data location algorithm used. Broadly speaking, a possible taxonomy of these algorithms is as follows: 1) state-less algorithms which do not use information stored previously during insertion or re-location of an individual data item; these algorithms use a mathematical function (typically some kind of unidirectional hash function) during data item insertion, re-location, and/or retrieval to find out the subset that contains the data item; 2) state-full algorithms which store information about the subset that contains every individual data item during data item insertion or re-location. Then, during data item retrieval, the algorithm reads the stored information to locate the subset, and 3) mixed algorithms start as state-less but allow applying the state-full logic for some data items. When used properly, a mixed algorithm conveys the advantages of the state-less and state-full algorithms in a single solution.

State-full algorithms provide the best flexibility in terms of data item re-location, allowing features like, for example, moving data items physically closer (in network hops) to points where those items are used more often, or to the computers experiencing less workload. However, these algorithms pose a processing bottleneck (each request implies querying the information about which subset contains the sought data item(s)) and a scalability issue (some information has to be stored for each and every individual data item in the larger data set, which takes up storage space from the distributed data storage).

For these reasons, highly distributed (e.g., hundreds of computers) data storage solutions typically use state-less algorithms. A state-less algorithm is fast and efficient (execution includes evaluating a hash function followed by reading an in-memory array) and consumes little space (the memory required to hold the array). However, re-location of individual data items is difficult, since the same hash function always delivers the same hash value for a given input value. Mixed algorithms provide some of the benefits of state-full algorithms, as long as the number of data times the state-full logic is applied to is small.

State-less algorithms are, however, not suitable for data sets characterized by multiple defining fields (keys). A defining field is a part of an individual data item that uniquely determines the rest of the item. For example, a phone number is a defining field (key) of a larger data set including phone lines throughout the world. Given the phone number, it is possible to determine additional data relative to a single phone line.

Data sets characterized by multiple defining fields (keys) will, in general, deliver different hash values for different input values. Thus, using a data set characterized by two or more defining fields (in the phone line example above, adding the network terminal point, NTP ID where the NTP ID is an identifier of the physical point of connection of a fixed phone line, e.g., an identifier for the phone line socket at a subscriber's home. Each fixed phone line is tied to one and only one NTP) as another defining field in the case of fixed phone lines, the subset obtained from the state-less algorithm, when using the phone number as a key value, is different from the subset obtained when using the NTP ID as a key, thus rendering impossible the task of determining a single subset which every data item belongs to.

Figure 1:
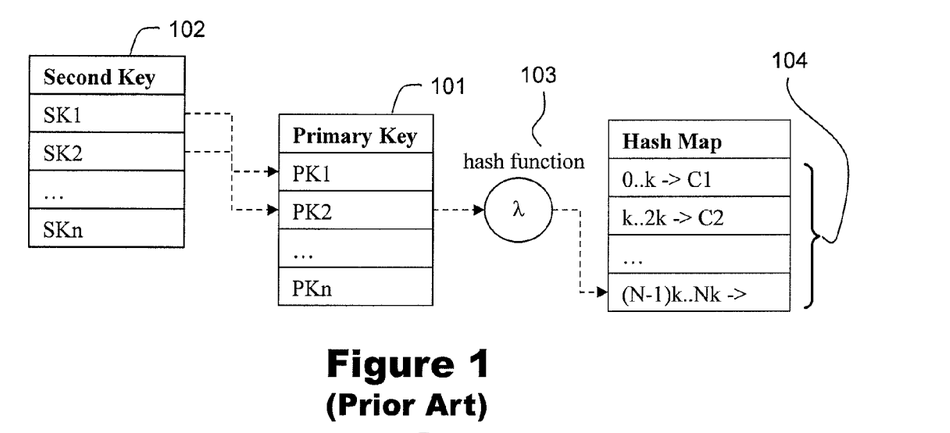
FIG. 1 illustrates a prior art example of solving a multiple-keys problem.

To overcome this multiple key problem, distributed data storage solutions using state-less/mixed algorithms typically use two-step indexing algorithms. FIG. 1 illustrates a non-limiting example solution to the multiple keys problem. There is a main index comprising the values of one defining field (Primary Key 101), plus a number of secondary indexes containing the values of each additional defining field (Second Key 102, etc.) associated to a reference to the corresponding defining field in the main index. To find the subset a data item belongs to (i.e., locating a computer (C1, C2, ... CN) storing a specific data item), using a key value stored in a secondary index, the secondary index is queried first to find the corresponding entry in the primary index, and then the hash function 103 is applied on the value stored in the primary index to determine a single subset 104.

However, the two-step indexing algorithm poses a problem in that the storage capacity used for holding the indexes grows linearly with the number of data items. In fact, when the number and size of defining fields (keys) is comparable to the size of a complete data item, a large amount of storage space is required just to hold the indices alone. How large can be estimated using the following formula: if s is the size of a complete data item and $s_i$ is the size of the defining fields of a data item:

$$n=N*S/(s+s_i)=N*S/s*(1+p)$$

where $p=s_i/s$; n (the distributed system's capacity) decreases as inversely proportional to 1+p. Thus it can be seen that when $s_i$ approaches s, the storage space required for storing indices is as large as that devoted to storing the data elements themselves.

Additionally, the index structure can become a processing bottleneck since it has to be checked for each and every query and requires extra storage space and more associated processing power (i.e., additional computers).

Moreover, there is no way to allocate a (subset of) data item(s) to one specific storage element in the distributed system. Targeted storage is beneficial in cases like when the distributed system spans large geographic areas (for example a country) and certain, often-accessed data item(s) are stored on a computer that is far—in network terms—from the point where the entity accessing it is located. Placing the often-accessed data item(s) in a computer close—in network terms—to the entity accessing them improves response time and decreases network utilization.

Existing systems allow the arbitrary allocation of data items to specific computers by means of a traditional associative array (one for every defining field, or key in the data item) that is searched prior to the two-step search process described above. This increases the time and resources used in every search, the storage space required for index structures (the aforementioned associative array).

What is needed is a data distribution and location method and system which overcomes the problems associated with expanding processing resources as well as multiple-key addressing, indexing, and reallocation of resources limitations.

SUMMARY

In one non-limiting example embodiment, a method is described for data distribution in a distributed data storage system. The distributed data storage system stores a set of data items across a plurality of physically distinct computers. Each physically distinct computer manages a subset of the data items. The method comprises: defining at least one metric space associated with the distributed data storage system, defining within the one metric space a number of hyper-spheres, each of the defined hyper-spheres having: a center and radius, data points representing corresponding data items, and an association with one or more of the physically distinct computers; calculating a distance from a specified data point, corresponding to a specified data item to be stored in the distributed data storage system, to the center of each of the defined hyper-spheres, and selecting at least one physically distinct computer for storage of the specified data item based on which of the hyper-sphere centers is closest to the specified data point and the association of the hyper-sphere to one or more computers.

A distance may be calculated, for example, from a specified data point, corresponding to a specified data item to be retrieved from the distributed data storage system, to a center of each of the defined hyper-spheres. At least one physically distinct computer may then be selected for data retrieval of the specified data item based on which of the hyper-sphere centers is closest to the specified data point and the association of the hyper-sphere to one or more computers.

Each data item may include one or more key fields, each key field representing a defining field of the data item within the set of data items, and every value of a key field is mapped to a real number corresponding to one of the dimensions of the metric space, the set of real numbers to which the key fields of a data item are mapped thus defining a data point in the metric space.

In accordance with a non-limiting example embodiment, the distributed data storage system is a cloud based storage system and/or a telecommunications oriented storage system storing telecommunications related data.

In accordance with a non-limiting example embodiment, each subset includes one or more key fields, each key field representing a defining field of one item within the set of data items, and the data retrieval step further comprises retrieval of data items when only a subset of the key field values defining the data items are known, by matching the subset of the whole set of data items whose mapped points are located on the hyper-plane that intersects one or more of the defined hyper-spheres, the hyper-plane defined by the coordinates to which the known key field values map.

In accordance with a non-limiting aspect of the technology described herein, a shared state of the metric space and associated hyper-spheres is available on reception of a data retrieval request from an external entity.

In accordance with a non-limiting aspect of the technology described herein, for numeric data, the mapping of numeric key fields is an identity function $f(x)=x$, and for character data, the mapping of character strings is based on Lehvenstein distance.

In accordance with a non-limiting aspect of the technology described herein, for numeric data, the mapping of numeric key fields is a compression function like e.g., the well-known µ-law: $f(x)=k*x*\ln(1+\mu|x|)/(|x|*\ln(1+\mu))$. Compression functions are useful when the range of values for x is large, since the mapped values spread over a smaller, more condensed area than the original values which is easier to manage for the distributed storage system.

In accordance with a non-limiting aspect of the technology described herein, a shared state is used containing the hyper-sphere centers and radii, and an identifier of every computer that is associated to every hyper-sphere of the defined at least one metric space and associated hyper-spheres, on reception of a data retrieval request from an external entity.

In accordance with a non-limiting aspect of the technology described herein, the defined hyper-sphere centers are fixed or are dynamically updated based on historical data. Defined spheres may be split/joined based on clustering of data points. Data points may be reallocated within a portion of a first hyper-sphere to a neighboring second hyper-sphere. Reallocating includes transferring the corresponding data items from a first physically distinct computer associated with the first hyper-sphere to a second physically distinct computer associated with the neighboring second hyper-sphere.

In accordance with a non-limiting aspect of the technology described herein, joining defined hyper-spheres comprises joining two defined hyper-spheres into a single defined hyper-sphere containing all data points of the two joined hyper-spheres and retaining all corresponding data items in a physically distinct computer associated with the single defined hyper-sphere.

In accordance with a non-limiting aspect of the technology described herein, redistributing the set of data items across the distributed data storage system is performed when one or more physically distinct computers are added to or removed from the plurality of physically distinct computers by creating or destroying respective hyper-spheres associated with each of the added or removed physically distinct computers followed by transferring of corresponding data items.

In another example embodiment, a distributed data storage system is described which stores a set of data items across a plurality of physically distinct computers interconnected by a network, each physically distinct computer managing a subset of the data items, each computer of the plurality of computers configured as a query processor and/or data storage device. The system comprises a data manager implemented using one or more of the physically distinct computers and configured to: define at least one metric space for the distributed data storage system, define within the one metric space a number of hyper-spheres, each of the hyper-spheres having a center and radius, data points representing corresponding data items, and an association with one of the physically distinct computers, and determine a location to retrieve a specified data item in the distributed data storage system by calculating a distance of the corresponding specified data point to a center of each of the defined hyper-spheres and selecting at least one physically distinct computer for retrieval of the specified data item based on which associated hyper-sphere's center is closest to the corresponding specified data point.

In accordance with another non-limiting aspect of the technology described herein, the data manager is further configured to determine a location to store a specified data item in the distributed data storage system by calculating a distance of the corresponding specified data point to a center of each of the defined hyper-spheres and selecting at least one physically distinct computer for storage of the specified data item based on which associated hyper-sphere's center is closest to the corresponding specified data point.

In accordance with another non-limiting aspect of the technology described herein, the data manager is further configured to redistribute data points within the hyper-spheres and corresponding data items across associated physically distinct computers. The data manager is configured to initiate the redistribution when one or more physically distinct computers is added to or removed from the plurality of physically distinct computers. The physically distinct computers are configured to redistribute data points within the hyper-spheres and corresponding data items across associated physically distinct computers and report the redistribution back to the data manager.

In accordance with another non-limiting aspect of the technology described herein, the data manager is configured to dynamically update the defined hyper-sphere centers based on historical data.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed (e.g., a cloud based network storage solution). Moreover, the term "processor" or "controller" also refers to other hardware capable of performing such functions and/or executing software, such as the example hardware recited above.

Non-limiting example embodiments of the technology described in this application may be used to store/retrieve telecommunications related data, locally or in distributed fashion across networks hardwired or wireless, using known or future data/telecom distribution networks. The technology may apply to any radio base network and in particular to a heterogeneous network comprising network nodes using any technology including HSPA, LTE, CDMA2000, GSM, etc. or a mixture of technologies such as with a multi-standard radio (MSR) node (e.g., LTE/HSPA, GSM/HS/LTE, CDMA2000/LTE, etc.).

In one non-limiting example embodiment, a distributed data storage system (e.g., plural computers, with associated data storage, connected locally or in distributed fashion across networks) uses a data distribution and location algorithm based on distance functions and hyper-spheres in a multi-dimensional space. The distributed data storage system uses the algorithm to maintain, over time, a balanced distribution across a number of computers interconnected by a network of a varying set of data items. Each data item is characterized by one or more defining values, commonly known in the art as key fields. Every data item is associated with one and only one set of defining values that uniquely identify it. Thus given the defining values, it is possible to find one and only one data element corresponding to said defining values. This system also enables efficient partial-match and exact-match searching across the whole set of data items using as search criteria the values of any or all of the sought data item's key field(s).

A metric space is a mathematical concept. Given a space of dimension N (i.e., every point in the space is identified by N values, known as coordinates), by defining a distance function as a function taking two points as arguments and returning a natural number and applying said function to the N-dimensional space builds an N-dimensional metric space. A well-known example of distance function is the Euclidean distance, defined as:

$$d(X,Y)=\sqrt{(\Sigma(x_i-y_i)^2)}, \text{ where } X=\{x_1,\ldots x_N\} \text{ and } Y=\{y_1,\ldots y_N\}.$$

Figure 2:
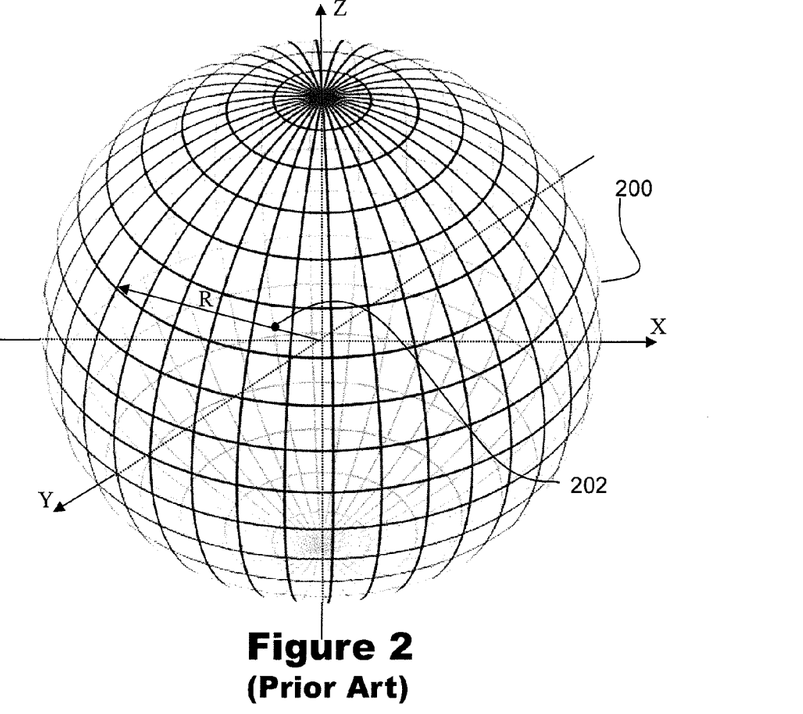
FIG. 2 illustrates a 3-dimensional hyper-cube.

FIG. 2 illustrates a basic hyper-sphere 200 in 3 dimensions. A hyper-sphere is defined as a mathematical object existing in a metric space, characterized by a central point and a radius such that all points on the hyper-sphere's surface are at the same distance from the central point and that distance is exactly the hyper-sphere's radius (e.g., 202). While a hyper-sphere in higher than three dimensions is difficult to visualize, it likewise is a volume in the N dimension having a surface where each point on the surface has the same distance to a central point. With dimension N, a point has n indexes where n=N. A point is then denoted as P(In). The center point is also defined the same way C(Jn). The distance D between P and C is the square root of the sum of the differences between indexes I and J in each dimension to the power of two.

Figure 3:
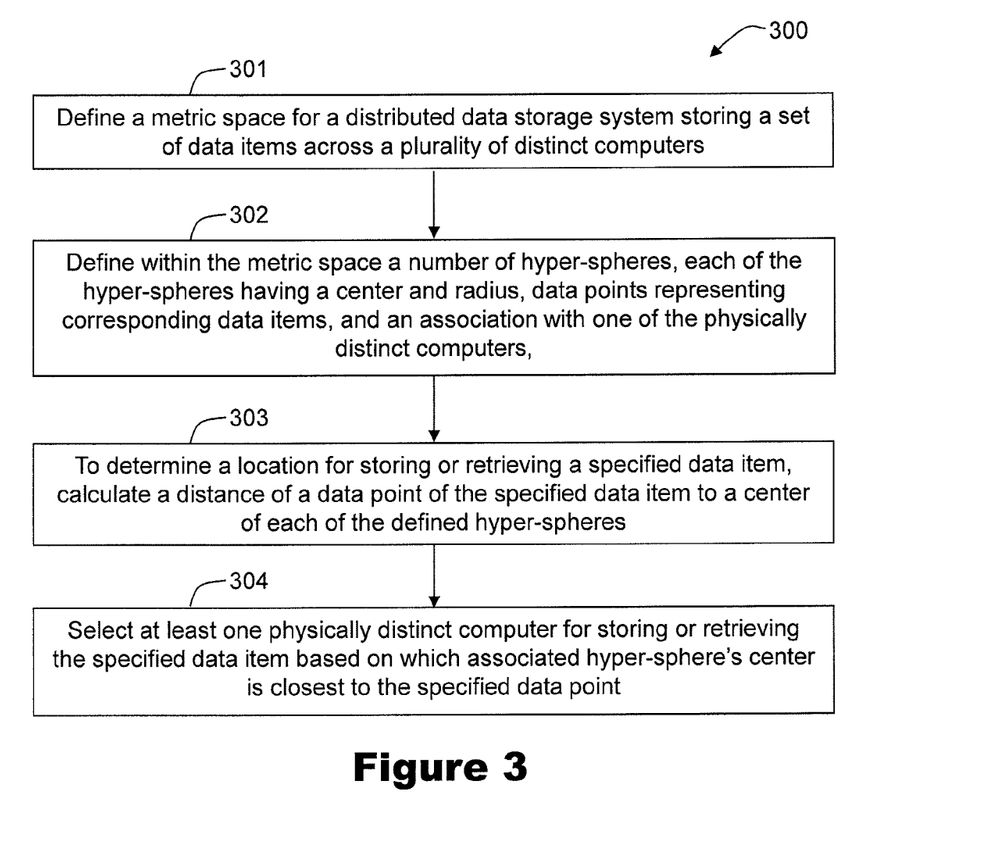
FIG. 3 illustrates a flow diagram of a non-limiting example embodiment for a method of data distribution in a distributed data storage system.

FIG. 3 illustrates a flow diagram of a non-limiting example embodiment for a method of data distribution/retrieval in a distributed data storage system. To determine an individual computer which should store a specific data item, a subset of data items which the specific data item belongs to is first identified according to the following procedure. In step 301, a metric space is defined by adding a distance function (non-infinite) to the multi-dimensional space generated by the points whose coordinates are generated by applying a set of mapping functions to each of the defining values of the larger data set; e.g., if one of the defining values of the larger data set is an integer number varying between 0 and 200, the mapping function f(x)=x generates one dimension of the space. The larger data set, comprised of the aggregate of specific data items, is stored across a plurality of distinct computers in subsets (allocated per computer) of the larger data set. In step 302, within this metric space a number of hyper-spheres are defined, each hyper-sphere being characterized by a center and radius, and being associated with one or more of the physically distinct computers comprising the data storage solution. In step 303, when inserting a data item in the data set, the distance of the point generated by that data item's defining values to the center of each of the hyper-spheres defined in the solution is calculated. In step 304, the data item is put into the data set held by the computer whose associated hyper-sphere's center is closer, in terms of the distance function defined over the multi-dimensional space, to the point generated by the defining values of the data item being inserted. Likewise, when retrieving a data item known the data item's defining values, the distance of the point generated by said defining values to the center of each of the hyper-spheres defined in the solution is calculated. According to the logic above, the data item identified by the aforementioned defining values is determined to belong to the subset of data items held by the computer whose associated hyper-sphere's center is closer to the point generated by the defining values.

Figure 4:
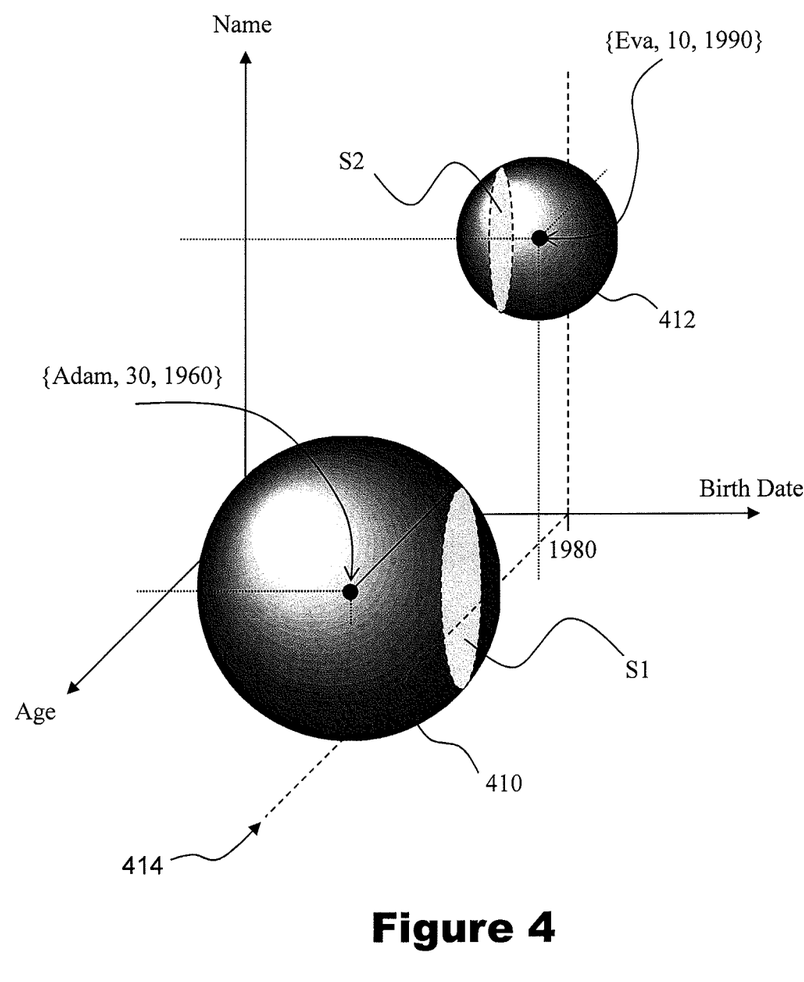
FIG. 4 illustrates a non-limiting example defining a person's name as a value of a data element representing a person.

Retrieving data items matching a subset of the set of defining values is also possible using the technology described herein. When only some of the defining values are used as keys, the provided values determine a hyper-plane that intersects one or more of the hyper-spheres defined in the solution. The corresponding retrieval request has to be addressed to the computers associated to those hyper-spheres, since any of them might hold data items matching the request. An example of this is shown in FIG. 4, where the defining values of a data element representing a person are the person's name (Name, a string of characters), age (Age, an integer number) and birth date (Birth Date, an integer number). In this example at least two hyper-spheres have been defined, whose centers are the points {Adam, 30, 1960} 410 and {Eva, 10, 1990} 412 and whose radii are 30 and 10 respectively. In this example space, the 'Birth Date' coordinate value 1980 414 defines a hyper-plane orthogonal to the Birth Date axis that intersects both hyper-spheres, creating the sections S1 and S2. Supposing each of the example hyper-spheres is associated to a different physical computer, a query requesting persons born in 1980 will need to be addressed to both physical computers associated to both hyper-spheres, since both hyper-spheres might contain data elements containing 1980 as 'Birth Date' defining value.

Finally, the technology described herein allows arbitrary allocation of subsets of data items to storage elements re-using the same mechanisms already described, by creating new, small hyper-spheres whose centers are close to those data items and allocating the newly-created smaller hyper-spheres to the desired storage elements.

Figure 5:
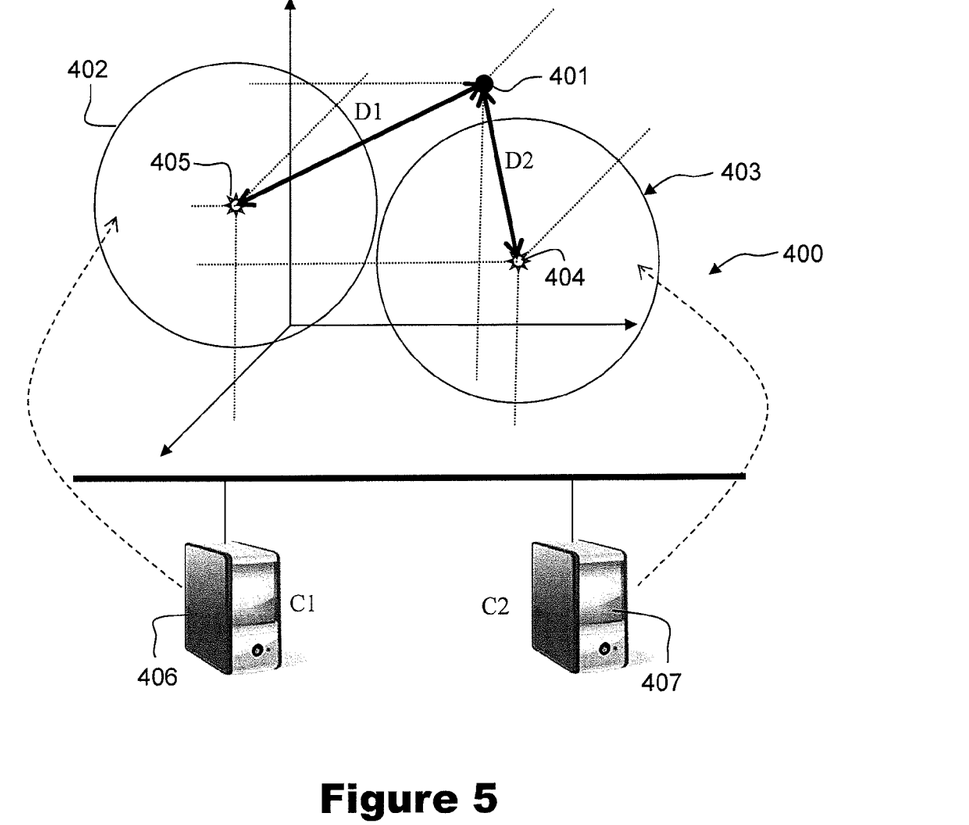
FIG. 5 two-computer storage solution holding a data set characterized by three keys.

FIG. 5 illustrates a non-limiting example two-computer storage solution holding a data set characterized by three defining fields (keys) 400 to provide a simple depiction of technology disclosed herein in a three-dimensional space. In the figure, computer C1 (406) has an associated hyper-sphere 402. Likewise, computer C2 (407) has an associated hyper-sphere 403. Data stored in computers 406 and 407 is mapped to geometric points within their respective hyper-spheres. In this example, depicted point 401 represents a new data item to be inserted into the storage solution set comprising the data subsets stored within computers C1 and C2. In this example, the depicted data point is closer to center 404 of hyper-sphere 403 associated with computer C2 than to the center 405 of hyper-sphere 406 associated with computer C1 (i.e., D2<D1). Therefore, upon insertion, the data item with defining fields taking the values corresponding to that point's coordinates is stored to the data storage subset held by C2. The same applies for data retrieval. Given the values of the sought data item's defining fields, the coordinates of the corresponding geometric point are calculated and the data retrieval request is sent to the computer whose associated hyper-sphere's center is closer to that geometric point.

Figure 6:
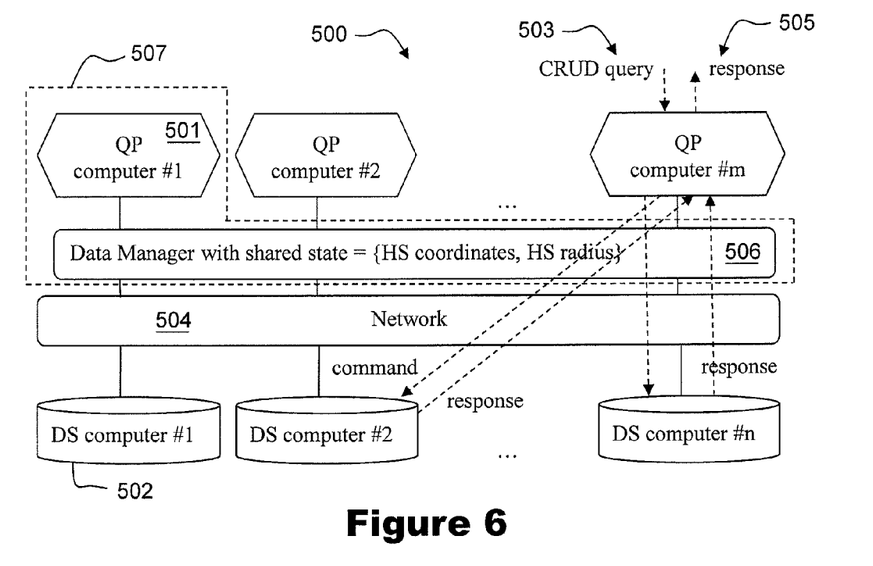
FIG. 6 illustrates a non-limiting example embodiment of a distributed data storage system.

FIG. 6 illustrates a non-limiting example embodiment of a distributed data storage and retrieval system 500. The system contains a number of general-purpose computers each including a processor, memory, network interface and optionally disk devices. Each computer in the system may take one of two roles, namely: query processor (QP-501) or data storage (DS-502). QP computers receive Create/Read/Update/Delete (CRUD) queries 503 from outside the system and issue commands on DS computers over network 504 interconnecting them. QP computers further receive responses from DS computers and use them to compose responses 505 to the CRUD queries submitted to the system.

QP computers typically process the location and retrieval hyper-sphere methodology as described herein. The QP computers share a common state, which includes the coordinates and radius of all the hyper-spheres used by the distributed storage and retrieval system, and an identifier of each computer that is associated with each hyper-sphere of the defined metric space and associated hyper-spheres. The shared common state is maintained by a data manager and made available to all computers (including DS) within the system. The data manager typically resides in a separate computer 506, but equally can reside within a QP (shown as 507) or DS computer (e.g., 502). QP or DS computers may take any of a number of forms, for example, a relational database management system (RDBMS), key-value store (KVS), or even plain file storage. All these forms are well known in the art and, may be needed to build a complete system.

In an alternative non-limiting embodiment, the data manager is implemented in software and stored/processed locally, across networks, or using computer storage media.

The QP computers process the hyper-sphere methodology described above using the specific state data obtained from the shared state on reception of a CRUD query from some external entity, and perform a corresponding action (storage/retrieval) on one or more DS computers.

In addition to efficient storage of data, the technology described herein seeks to balance data distribution amongst the elements of a distributed computing system and efficiently locate those data given one or more fully- or partially-specified defining values.

Example distribution and location algorithms that cooperate to perform the distribution and location features are uniform hash tables and trees. Uniform hash tables are used to homogeneously allocate individual data items to elements of the distributed system so that each element holds approximately the same amount of data; and trees are used to index individual data items based on their defining value(s) so that each item can be located efficiently and within constant time.

Figure 7:
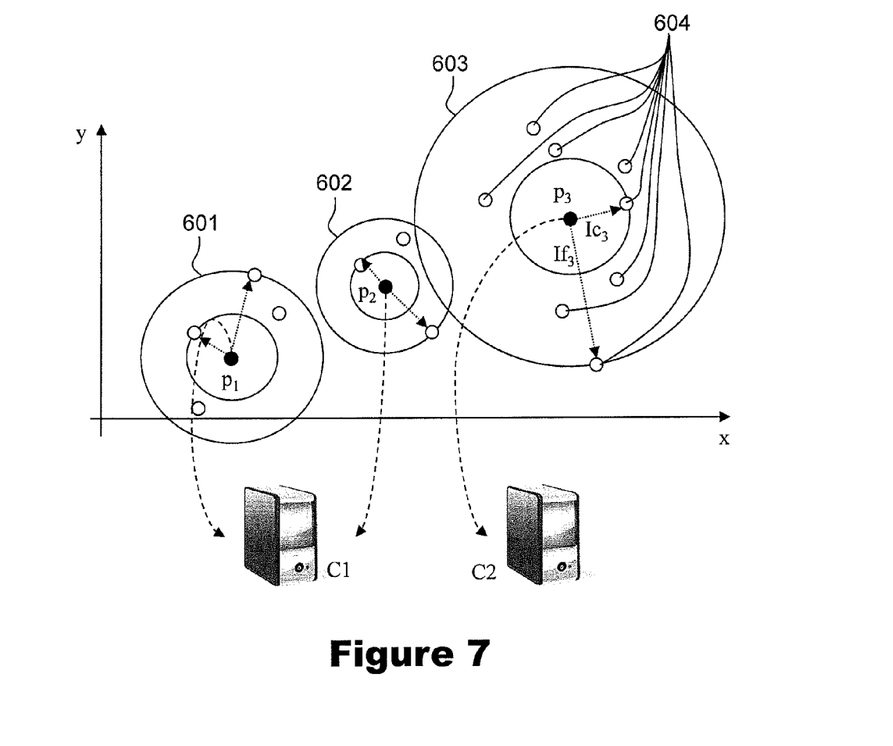
FIG. 7 illustrates a non-limiting example of allocation of points to elements.

FIG. 7 illustrates non-limiting graphical example of allocation of data points to storage elements. Hyper-sphere elements 601, 602, and 603 each contain possible data points (e.g., points $p_1, p_2, p_3, \ldots p_n$) mapped to a larger data storage set comprised of specific data subsets stored in computers C1 and C2. As an example, hyper-sphere element 603 contains possible data points 604 mapped to a data subset stored in computer C2.

Theoretical foundations of the data distribution and location algorithm for allocation of individual data items to computers in the distributed system are now described. A data class is first defined as, "entity" in terms of the Entity-Relationship model, as a set of k fields E={f1, f2, ... fk}. Over that data set, a subset of fields is defined for identifying every individual member of that class, I={f1,f2, ... fi} with i≤k.

A metric dimensional space is defined by applying a distance function d to the i-dimensional space generated by all the possible values of I: $d=|I_1-I_2|$. Within this space are defined a number of points $P=\{p_1, p_2, p_3 \ldots p_n\}$, each point is the center of one and only one hyper-sphere element of the storage solution, and each point is linked to at least one computer in the solution. An individual data item D characterized by its defining value set $I_D$ is allocated to the i-th computer in the solution which linked point $p_i$ verifies that:

$d(I_D,p_i)<d(I_D,p_j)$ for every j≤n

For every point $p_i$, the solution keeps the distances to the closest and farthest I allocated to the same computer as $p_i$. In other words, let $Ic_i$ (e.g., $Ic_3$ of hyper-sphere 603) and $If_i$ (e.g., $If_3$ of hyper-sphere 603) be the closest and farthest I values, respectively, allocated to the same element as $p_i$. For every computer $e_k$ part of the distributed storage solution, the following information is maintained in a so-called "shared state", the term "shared" meaning that is accessible to any computer part of the distributed storage solution:

$e_k$->({$p_i$, $Ic_i$, $If_i$}, {$p_j$, $Ic_j$, $If_j$}, ... )

Locating individual data items, given a data item $I_D$ characterized by all its defining values, locating the computer of the distributed storage solution holding said item comes down to calculating:

$\min(d_D)=\min(|I_D-p_i|$ for every i≤n)

When n is large, calculating the set of values across whose min( ) function is applied, may become computationally harder than traversing a tree-like data structure, as is known in the art. However, modern computers have sufficient hardware capability to calculate dozens of distance d values in parallel leveraging e.g., SIMD processor instructions, making this computational effort affordable.

In a typical example case, however, not all defining values of a data item are provided in a location query, but just a subset of them (and most commonly just one). A subset of values defines a hyper-plane in the metric space already mentioned. Two different situations can exist.

A first situation occurs when defining value(s) is (are) unique across all individual data items (key): in this case the individual data item will have been allocated to the physical computer which associated hyper-sphere has its center closest to the hyper-plane. The closest point is the one which distance from its projection on the hyper-plane along a hyper-line orthogonal to the hyper-plane is shorter. This is difficult to visualize in general, so an example in a three-dimensional metric space using Euclidean distance is provided below and shown in FIG. 8.

Figure 8:
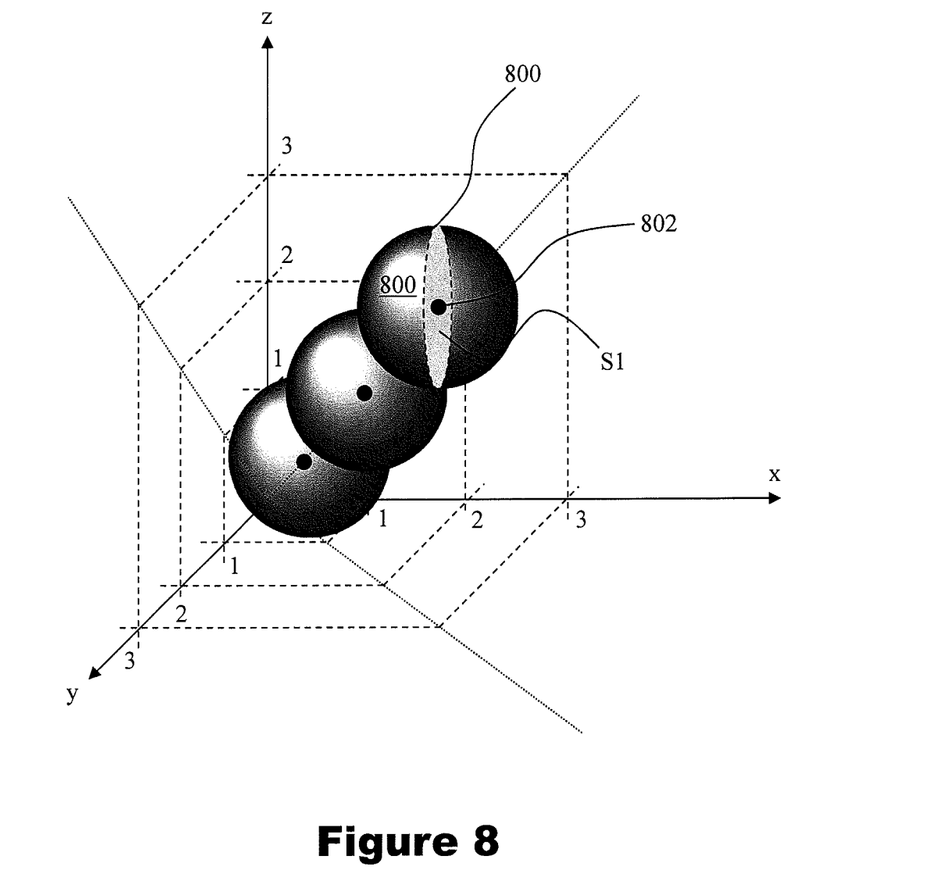
FIG. 8 illustrates a non-limiting example of a three-dimensional metric space using Euclidean distance.

If n=3, $p_i=(x_i=i, y_i=i, z_i=i)$ and $r_i=1$. The subset of defining values {x}={3} defines a vertical plane 800 orthogonal to the x axis. The closest point along its projection on this plane (horizontal line parallel to the x axis) is $p_3$ 802 (which value is 3, actually $p_3$ is on the plane itself), so the physical computer associated to the hyper-sphere 804 which center is at {3, 3, 3} holds the sought data item.

Notice, that depending on how the points in P have been distributed, it might happen that there are multiple closest (to the hyper-plane) points in P at the same distance from it. In this case there's no choice but broadcasting the query to all the computers whose linked hyper-spheres' centers lie at the same, closest distance since without further defining values it is impossible to know which computer actually holds the sought item. A possible strategy to avoid this situation is to define P such that all hyper-spheres' centers lie at different distances from the hyper-plane defined by the most used primary key(s). The example of FIG. 8 uses that strategy where x is the most used primary key.

A second situation occurs when defining value(s) is(are) NOT unique across all individual data items (index): in this case there might be multiple computers in the distributed storage solution holding items that match the provided value(s), and which are those elements depends on the other, not provided defining values. An example of this was shown in FIG. 4. This case can be supported using a tree-based index structure in which nodes are pairs (point-distance). This approach has been researched elsewhere, see e.g., "Prefix Hash Tree (PHT)" (http://berkeley.intel-research.net/sylvia/pht.pdf).

Figure 9A:
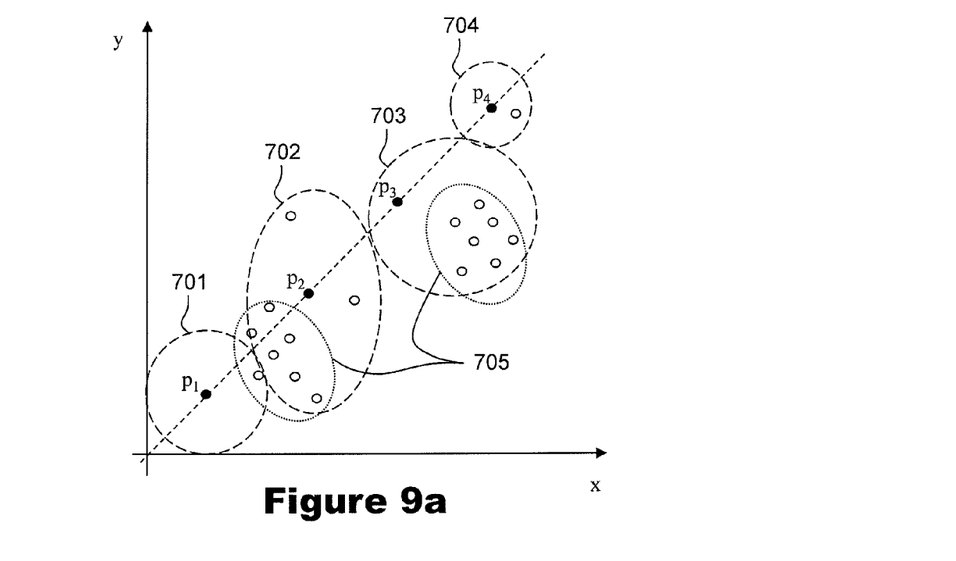
FIG. 9a illustrates a non-limiting example of information cumuli in 2-dimensional space.

Over time, using the data allocation technology described herein, there will be hyper-spheres (and corresponding associated computers), within a metric N-dimensional space including points P, that will be allocated to store more individual data items than others (i.e. an unbalanced concentration). For example, as shown in FIG. 9a, hyper-spheres 701, 702, 703, and 704 include various data points (e.g. $p_1$, $p_2$, $p_3$, $p_4$ . . . $p_n$) and additional concentrations of data points in so-called "information cumuli" 705 (shown in 2-dimensional space for clarity).

These points are referred to as "information cumuli", since they hold more information on average than the rest of the hyper-sphere elements in the system. This syndrome is undesirable, since with a high probability information cumuli will receive more queries per unit of time than the other hyper-sphere/storage elements in the system, creating a processing bottleneck in the distributed storage solution. Moreover, one information cumuli might spill outside the storage capacity S of the computer it is deployed on. Systems using uniform hashing-based algorithms do not suffer from this problem since the hashing spreads the input values uniformly across the hash function's range of output values. However, for data sets with multiple defining values (keys), the hashing approach poses a problem where the association between each defining value and its corresponding output value has to be stored somewhere, ultimately being the reason that storage space used for indexes grows linearly with the number of items stored and the number of defining fields.

To deal with information cumuli, the technology described herein preferably dynamically updates the hyper-sphere centers. The updates, in one non-limiting aspect, are based on historical data with changes (e.g., new center point and radius) reported to the data manager (common state update). Historical data is defined as a snapshot of currently stored data, but can equally include all data that has been stored (and may be deleted later) or include previous distribution patterns to anticipate future distribution scenarios. In addition, in one non-limiting embodiment, a floating time window is used to adjust the center of the spheres, e.g., by noting changes in data storage behavior over time and discarding old stored data in exchange for new data.

Figure 9B:
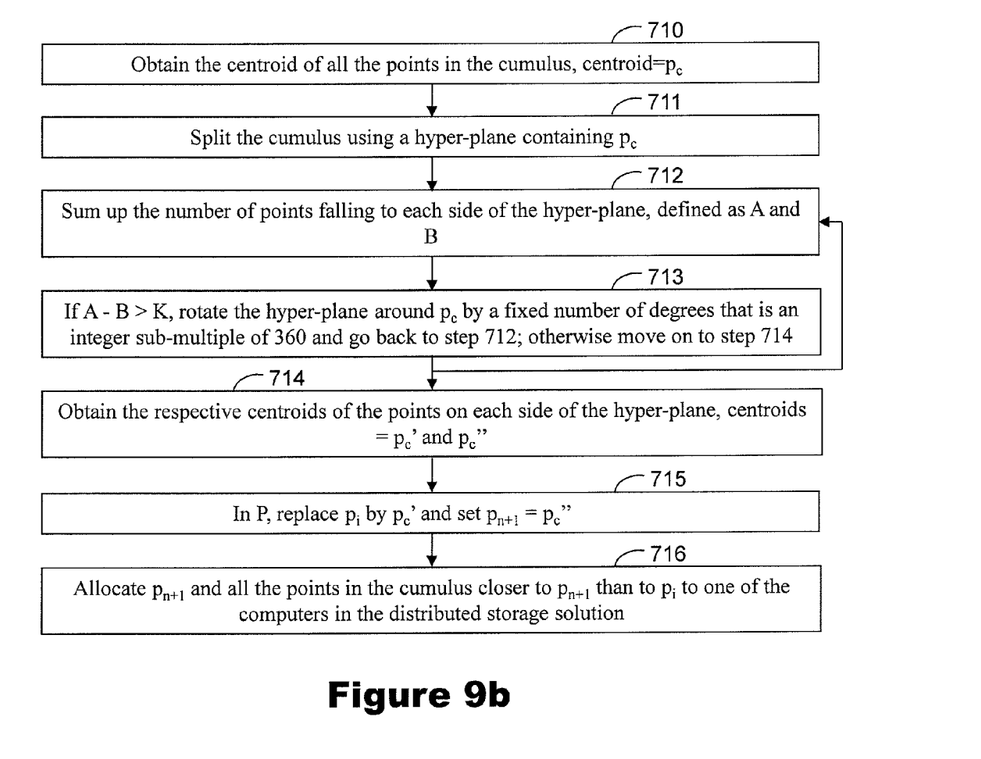
FIG. 9b illustrates a non-limiting example flow diagram for splitting cumulus information cumuli in 2-dimensional space.

In one non-limiting aspect, cumuli are split in halves, allocating each half to a different hyper-sphere (thus computer) in the distributed storage solution. When a cumulus is formed including point $p_i$, splitting is done by moving point $p_i$ to a new point $p_i'$ and creating a new point whose distance from half the points in the cumulus is smaller than the distance from those same points to the moved or new point $p_i'$. The points $p_i'$ and $p_{n+1}$ fulfill the condition that no individual data item already allocated to a computer distinct from that linked to $p_i$ has to be moved to another element as a consequence of the splitting.

FIG. 9b illustrates non-limiting example flow diagram for splitting a cumulus information cumuli in 2-dimensional spaces. The steps include:

In step 710, obtain the centroid of all the points in the cumulus, define the centroid as $p_c$;

In step 711, split the cumulus using a hyper-plane containing $p_c$;

In step 712, sum up the number of points falling to each side of the hyper-plane, say A and B;

In step 713, if A differs from B by more than a certain threshold, rotate the hyper-plane by a fixed number of degrees that is an integer sub-multiple of 360 and go back to step 712, else;

In step 714, obtain the respective centroids of the points on each side of the hyper-plane, say the centroids are $p_c'$ and $p_c''$;

In step 715, in P, replace $p_i$ by $P_c'$ and set $p_{n+1}=P_c''$, and allocate $p_{n+1}$ and all the points in the cumulus closer to than to $p_{n+1}$ to one of the elements in the distributed storage solution (e.g., the element to which fewer points have been allocated so far).

Figure 10:
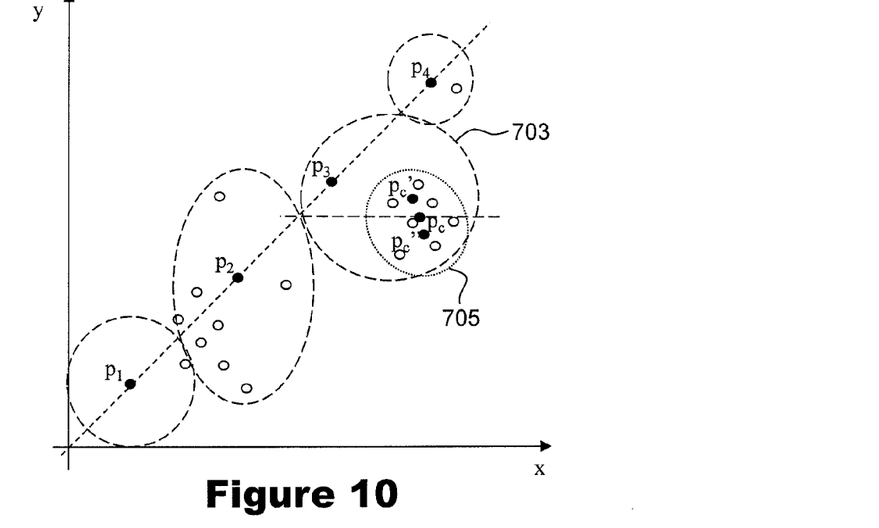
FIG. 10 illustrates a non-limiting example result of splitting cumulus information cumuli in 2-dimensional space around point $p_3$ using the method of FIG. 9b.

FIG. 10 illustrates a non-limiting example splitting of the cumuli 705 of hyper-sphere 703 in 2-dimensional space around point $p_3$ using the method of FIG. 9b. Since $p_c'$ and $p_c''$ are the respective centroids of the points at each side of the splitting hyper-plane, those points can only be closer to $p_c'$ and $p_c''$ respectively than they were to $p_i$. Thus, the splitting does not cause a point in the cumulus to be moved to a neighboring (to $p_i$) point in P. Therefore, half the points in the cumulus will remain with the storage element they were at before the split, and the other half will be moved to another computer.

As shown with the splitting example, partitioning of the metric space increases optimization of the distribution and retrieval system allowing every group of points to have some point from P "close" to them.

When the points to allocate are distributed uniformly across the space partitioning, divide the whole space into hyper-cubes of a given depth and then partition each hyper-cube into hyper-pyramids whose vertexes converge in the center of the hyper-cube. An example partitioning method is described in "Indexing the Distance (iDistance)" (http://en.wikipedia.org/wiki/The_iDistance_Technique).

When the points are, however, heterogeneously distributed (the typical situation), it is necessary to define clusters across the space that group as many points as possible each. Such a partitioning scheme is also described in "Indexing the Distance (iDistance)".

With clustering-based partitioning, individual data items can be allocated to specific computers elements of the distributed storage solution, e.g., for reasons of proximity (e.g., in network hops) to the machine accessing those data items more often. To achieve that effect, one point from P must be closest to the point or set of points characterizing the data item(s) to be allocated than any other points in P. Assume that the point in P fulfilling that requirement is $p_i$. By linking $p_i$ to the computer in question, all the points closest to $p_i$ are allocated to that computer. One approach, when there is one single point to allocate (say $I_D$), is to set $p_i=I_D$, so the distance $d(p_i, I_D)=0$.

Notice that for allocating arbitrary sets of data items to a single determined computer, it may be impossible to obtain a single point that is closest to all the corresponding defining values than any other point in P. In that case, multiple points must be obtained so that each of them is closest to some (possibly just one) of the defining values.

During the operating life-time of the distributed storage solution, changes in configuration of elements will likely take place. For example, computers will be taken in and out of the solution, even in groups, and data distribution across the complete solution must be kept consistent along all these changes. In these examples, data re-distribution may be needed.

Figure 11:
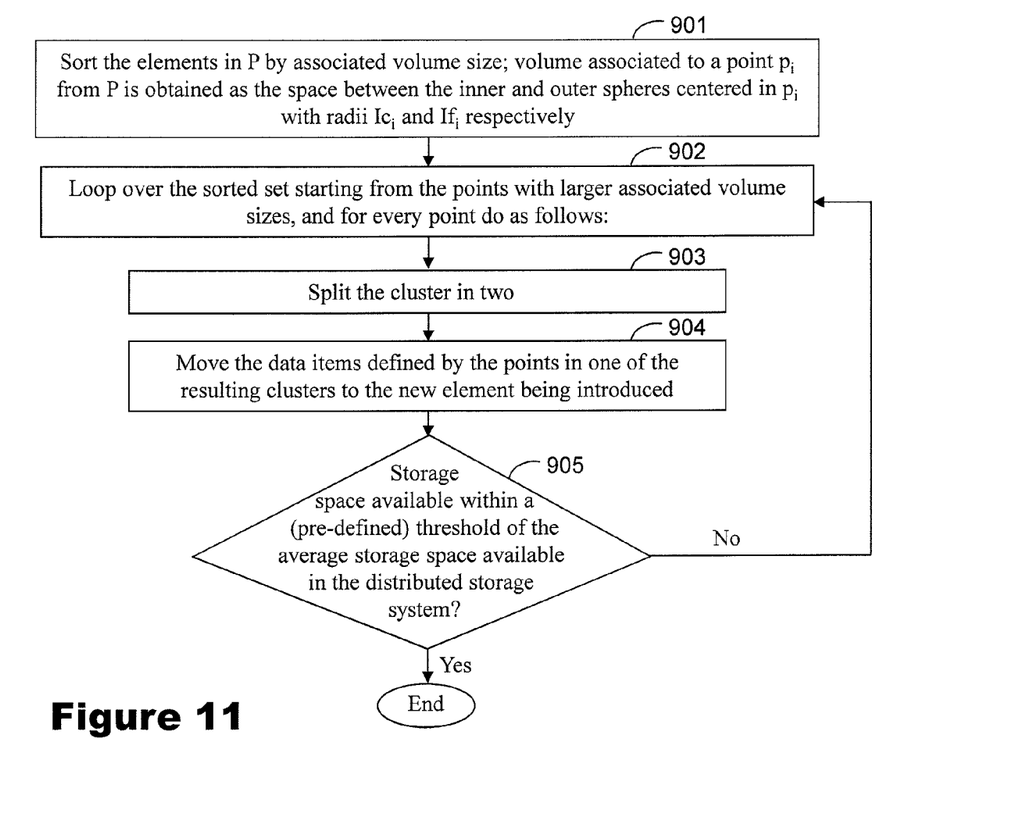
FIG. 11 illustrates a non-limiting example flow diagram for re-distribution of data in a distributed data storage system when new storage elements are added.

FIG. 11 illustrates a non-limiting example flow diagram for re-distribution of data in a distributed data storage system keeping data distribution consistent in the presence of newly introduced computers. The steps are as follows:
 a. In step 901, sort hyper-sphere elements in P by associated volume size; volume associated to a point $p_i$ from P is obtained as the space between the inner and outer spheres centered in $p_i$ with radii $Ic_i$ and $If_i$ respectively
 b. In step 902, loop over the sorted set starting from the points with larger associated volume sizes, and for every point do as follows:
  In step 903, split the cluster in two
   In step 904, move the data items defined by the points in one of the resulting clusters to the new computer being introduced;
 c. In step 905, run the loop above until storage space available in the new computer falls within a (pre-defined) threshold of the average storage space available in the distributed storage solution, not considering the new computer.

Figure 12:
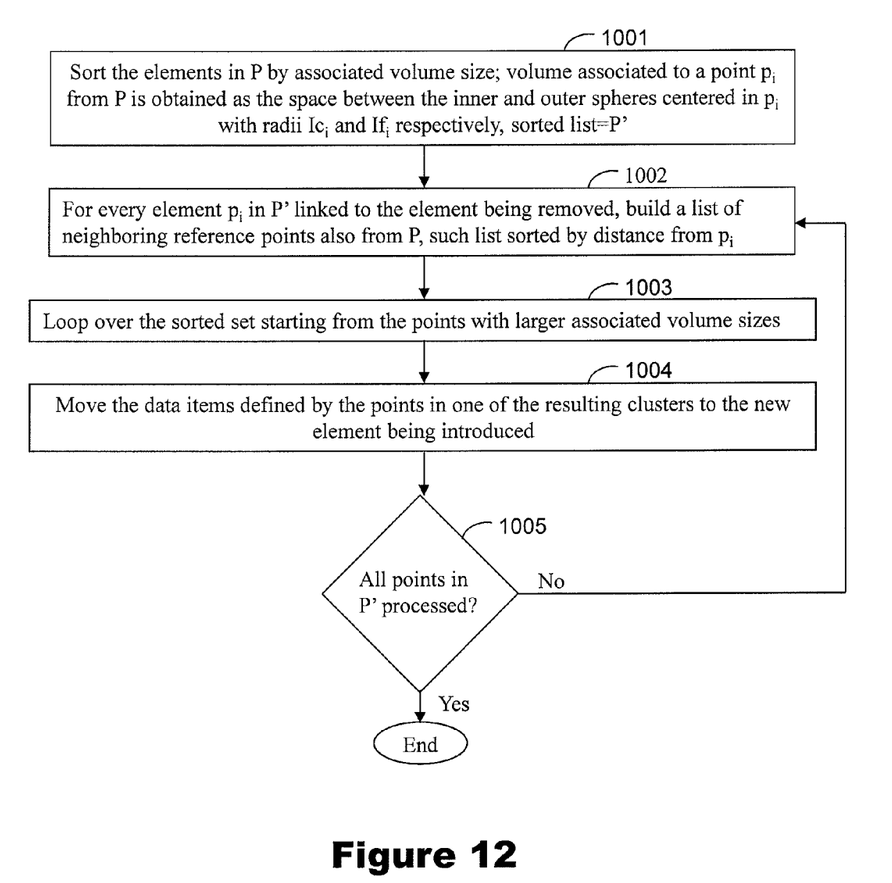
FIG. 12 illustrates a non-limiting example flow diagram for re-distribution of data in a distributed data storage system when existing storage elements are removed.

FIG. 12 illustrates a non-limiting example flow diagram for re-distribution of data in a distributed data storage system keeping data distribution consistent in the presence of removed computers. The steps are as follows:
 a. In step 1001, sort the elements in P by associated volume size; volume associated to a point $p_i$ from P is obtained as the space between the inner and outer spheres centered in $p_i$ with radii $Ic_i$ and $If_i$ respectively; the sorted list is stored as P';
 b. In step 1002, for every element $p_i$ in P' linked to the computer being removed, build a list of neighboring reference points also from P, such list sorted by distance from $p_i$
 c. In step 1003, loop over the set of points in P' linked to the computer being removed, and for every point, in step 1004, move every individual data item determined by one point allocated to the storage element being removed to the closest neighboring reference point (neighboring reference points were obtained in step 1002 above)
 d. In step 1005, run the loop above until the whole set of points in P' have been processed, in which case the computer to be removed from the solution should not have any individual data items allocated.

The just described method that "collapses" clusters of points has the drawback that data items have to be moved one by one to their new destinations, as opposed to the previous splitting method that splits clusters where points can be moved in groups. To avoid this, in step 1001, instead of moving points straight away, lists of points whose destination will be the same can be built, the items determined by each list moved as a group after step 1004.

When the data to be stored in the distributed data storage solution is numeric data, the distance function used to build up the metric space can be the Euclidean distance, which calculation is easy and fast in modern processors. In this case, for example, the mapping function for numeric key fields may be the identity function $f(x)=x$. However, when the data is of the array of characters (a.k.a. string) type, distance calculation gets more complicated and the distance function could, for example, be the Lehvenstein distance.

When an exact match is desired, calculate distance as:

$$\text{len}(s)+\text{ndiff}(s,s_r)*\text{len}(s_r)$$

s is defined as the actual string which distance to a reference string $s_r$ to obtain,
len( ) a function returning the length (i.e., number of characters) of a string and
ndiff( ) a function returning the number of characters that differ between the two strings passed as arguments.

However, when what is being matched is a pattern, location of data items get more complicated. There are several known algorithms for calculating distances between approximate strings. Each of them has its advantages and drawbacks. Examples of such algorithms are described in "The Levehnstein Distance" (http://en.wikipedia.org/wiki/Levenshtein_distance) and "The Damerau-Levehnstein Distance" (http://en.wikipedia.org/wiki/Damerau%E2%80%93Levenshtein_distance). Any of these algorithms is suitable to use with the technology described herein.

A non-limiting example embodiment includes a distributed computer system, although it could be embodied by any system made of one or more processing units interconnected by some communication means (including telecommunications systems such as radio networks) with access to memory (to store and retrieve data) and I/O capabilities (to receive CRUD queries from some external entity).

The scale of the problem the technology described herein solves can be large, e.g., millions or tens of millions of data items managed by a single system. However, the technology described herein may also advantageously, in other embodiments, address problems on a smaller scale.

A non-limiting example embodiment includes a number (m+n) of computers interconnected by a network, each computer playing one of two different roles: Query Processors (m QP computers) and Data Stores (n DS computers). A single computer may fulfill both a QP role and a DS role simultaneously, though having the roles performed by separate computers enables scaling each role independently (m does not depend on n). While the QP role is processing-intensive, since it runs the data distribution and location methodology, the DS role is memory-intensive since it stores the actual data. Thus computers fulfilling each role may have different hardware characteristics.

External entities may submit a CRUD query to any of the m QP computers. On reception of a CRUD query, the receiving QP computer:
 a. Identifies the type of query (C, R, U or D);
 b. Identifies the index field value(s) included with the query;
 c. If the query is of the C type (create):
 d. If the external entity has not specified a preferred DS computer which the new data item should be allocated to, follow the previously described allocation of the data item to one of the n DS computers; notice that as a side effect of this step, the shared state between all the QP computers might have to be updated, in which case the update will be performed in a consistent way (i.e., all m QP computers see only the final outcome of the update);
 e. If, after the allocation, the number of data items held by the DS computer selected in the previous step raises above a threshold, apply the splitting processes previously described in order to move some data items from that DS computer to another one holding fewer data items; selection of the items to move and receiving DS computer is performed such that the number of data items held by each of the n DS computers in the system remains as balanced as possible;

f. If the external entity has specified the DS computer it wants, the new data item to be allocated thereto, follow the previously described allocation of the data item to one of the n DS computers to achieve the requested allocation; the same considerations regarding shared state as for step a) above apply in this case;

g. Produce a command semantically equivalent to the C query submitted by the external entity that is suitable for the DS computer selected in the previous step;

h. Submit the command to the DS computer and receive the corresponding response;

i. Produce a C response semantically equivalent to the response received from the DS computer but suitable for the external entity that submitted the C query and send the response to said entity j. If the query is of the R (read), U (update) or D (delete) types:

k. Follow the location methodology previously described in order to identify the DS computers affected by the query;

l. Produce a command semantically equivalent to the R/U/D query submitted by the external entity that is suitable for the DS computers selected in the previous step;

m. Submit the command to the DS computers and receive the corresponding responses;

n. Produce a response semantically equivalent to the responses received from the DS computer but suitable for the external entity that submitted the R/U/D query and send the response to said entity o. When the number n of DS computers in the system changes, one of the m QP computers will run the reallocation process described in order to keep the number of data items held by each DS computer balanced (i.e. as close as possible to the average number of data items per DS computer). The QP computer running the algorithm is notified by a system-wide management entity of the change in the configuration of DS computers.

Prior data storage solutions which hold data items characterized by multiple defining values (keys), using hash-based state-less algorithms, suffer from growth of storage capacity devoted to index management as O(m, i) being m the number of data items stored and i the number of indexes defined over those items. The technology described herein greatly reduces allocation of resources for indexing, by reducing it to storing the value set $\{e_k\}$. Additionally, re-distribution of data (i.e., moving individual data items between elements of the solution) is difficult (impossible in solutions using state-less data distribution), since the mixed-state solution must create and maintain an index structure in addition to the state-less distribution function. However, the technology described readily redistributes data by splitting of clusters using centroids and hyper-planes.

Although the description above contains many specifics, they should not be construed as limiting but as merely providing illustrations of some presently example embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method of data distribution in a distributed data storage system, the distributed data storage system storing a set of data items across a plurality of physically distinct computers, each physically distinct computer managing a subset of the data items, the method comprising:

defining at least one metric space associated with the distributed data storage system;

defining within the one metric space a number of hyper-spheres, each of the defined hyper-spheres having a center and radius, data points representing corresponding data items, and an association with one or more of the physically distinct computers;

calculating a distance from a specified data point, corresponding to a specified data item to be stored in the distributed data storage system, to a center of each of the defined hyper-spheres; and selecting at least one physically distinct computer for storage of the specified data item based on which of the hyper-sphere centers is closest to the specified data point;

wherein each data item includes one or more key fields, each key field representing a defining field of the data item within the set of data items;

wherein every value of a key field is mapped to a real number; and wherein the set of real numbers to which the key fields of a data item are mapped comprises a data point in the metric space.

2. The method of claim 1, further comprising:

calculating a distance from a specified data point, corresponding to a specified data item to be retrieved from the distributed data storage system, to a center of each of the defined hyper-spheres; and selecting at least one physically distinct computer for data retrieval of the specified data item based on which of the hyper-sphere centers is closest to the specified data point and the association of the hyper-sphere to such physically distinct computer.

3. The method of claim 1:

wherein each subset includes one or more key fields, each key field representing a defining field of one item within the set of data items;

the method further comprising retrieving data items when only a subset of the key field values defining the data items are known, by matching the subset of the whole set of data items whose mapped points are located on a hyper-plane that intersects one or more of the defined hyper-spheres, the hyper-plane defined by the coordinates to which the known key field values map.

4. The method of claim 3, wherein a data retrieval request is addressed simultaneously to each physically distinct computer associated with each of the hyper-spheres intersected by the hyper-plane.

5. The method of claim 1, wherein for numeric data, the mapping of numeric key fields is based on an identity function $f(x)=x$.

6. The method of claim 1, wherein, for character data, the mapping of character strings is based on Levenshtein distance.

7. The method of claim 1, wherein, for numeric data, the mapping of numeric key fields is based on a compressing function $f(x)$ such that $f(x_{min}) \gg x_{min}$ and $f(x_{max}) \gg x_{max}$.

8. The method of claim 1, further comprising using a shared state containing the hyper-sphere centers and radii, and an identifier of every computer that is associated with every hyper-sphere of the defined at least one metric space and associated hyper-spheres, on reception of a data retrieval request from an external entity.

9. The method of claim 1, wherein the defined hyper-sphere centers are fixed.

10. The method of claim 1, wherein the defined hyper-sphere centers are dynamically updated based on historical data.

11. The method of claim 1, further comprising dynamically splitting or joining defined hyper-spheres based on clustering of data points.

12. The method of claim 11, wherein splitting defined hyper-spheres comprises reallocating data points within a portion of a first hyper-sphere to a neighboring second hyper-sphere.

13. The method of claim 12, wherein reallocating data points includes transferring the corresponding data items from a first physically distinct computer associated with the first hyper-sphere to a second physically distinct computer associated with the neighboring second hyper-sphere.

14. The method of claim 11, wherein joining defined hyper-spheres comprises joining two defined hyper-spheres into a single defined hyper-sphere containing all data points of the two joined hyper-spheres and retaining all corresponding data items in a physically distinct computer associated with the single defined hyper-sphere.

15. The method of claim 1, further comprising:
redistributing the set of data items across the distributed data storage system when one or more physically distinct computers are added to or removed from the plurality of physically distinct computers by creating or destroying respective hyper-spheres associated with each of the added or removed physically distinct computers followed by transferring of corresponding data items.

16. The method of claim 1, wherein the distributed data storage system comprises a cloud based storage system.

17. The method of claim 1, wherein the distributed data storage system comprises a telecommunications storage system and the set of data items includes telecommunications-related data.

18. A distributed data storage system for storing a set of data items across a plurality of physically distinct computers interconnected by a network, each physically distinct computer managing a subset of the data items, each computer of the plurality of computers configured as a query processor and/or data storage device, the query processor and/or data storage device comprising a data manager implemented using one or more of the physically distinct computers and configured to:
define at least one metric space associated with the distributed data storage system;
define within the at least one metric space a number of hyper-spheres, each of the hyper-spheres having a center and radius, data points representing corresponding data items, and an association with one or more of the physically distinct computers; and
determine a location to store a specified data item in the distributed data storage system by:
calculating a distance of the corresponding specified data point to a center of each of the defined hyper-spheres; and
selecting at least one physically distinct computer for storage of the specified data item based on which associated hyper-sphere's center is closest to the corresponding specified data point;
wherein each data item includes one or more key fields, each key field representing a defining field of the data item within the set of data items;
wherein every value of a key field is mapped to a real number; and
wherein the set of real numbers to which the key fields of a data item are mapped comprises a data point in the metric space.

19. The distributed data storage system of claim 18, wherein the data manager is further configured to determine a location to retrieve a specified data item in the distributed data storage system by:
calculating a distance of the corresponding specified data point to a center of each of the defined hyper-spheres; and
selecting at least one physically distinct computer for retrieval of the specified data item based on which associated hyper-sphere's center is closest to the corresponding specified data point.

20. The distributed data storage system of claim 18, wherein the data manager is further configured to redistribute data points within the hyper-spheres and corresponding data items across associated physically distinct computers when one or more physically distinct computers are added to or removed from the plurality of physically distinct computers by creating or destroying respective hyper-spheres associated with each of the added or removed distinct computers followed by transferring of corresponding data items.

21. The distributed data storage system of claim 18, wherein the data manager is further configured to initiate the redistribution, when one or more physically distinct computers is added to or removed from the plurality of physically distinct computers, by creating or destroying respective hyper-spheres associated with each of the added or removed physically distinct computers followed by transferring of corresponding data items.

22. The distributed data storage system of claim 18, wherein one or more of the physically distinct computers is configured to:
redistribute data points within the hyper-spheres and corresponding data items across associated physically distinct computers; and
report the redistribution back to the data manager.

23. The distributed data storage system of claim 18, wherein the distributed data storage system comprises a cloud-based storage system.

24. The distributed data storage system of claim 18, wherein the distributed data storage system comprises a telecommunications-oriented storage system and the set of data items includes telecommunications related data.

25. The distributed data storage system of claim 18, wherein data retrieval of a specified data item includes use of a shared state of the defined at least one metric space that contains the hyper-sphere centers and radii, and an identifier of every physically distinct computer.

26. The distributed data storage system of claim 18, wherein the data manager is configured to dynamically update the defined hyper-sphere centers based on historical data.

27. The distributed data storage system of claim 18, wherein the computer configured as a query processor comprises a subscriber location function of an Internet Protocol Multimedia Subsystem (IMS) network.

28. The distributed data storage system of claim 18, wherein the computer configured as a data storage device comprises a home subscriber server of an Internet Protocol Multimedia Subsystem (IMS) network.

* * * * *